United States Patent Office 3,536,744
Patented Oct. 27, 1970

3,536,744
HALOALKOXYSILANES
Robert E. A. Dear, Morristown, N.J., assignor to Allied Chemical Corporation, New York, N.Y., a corporation of New York
No Drawing. Filed Jan. 5, 1968, Ser. No. 695,883
Int. Cl. C07f 7/04, 7/18
U.S. Cl. 260—448.8           4 Claims

ABSTRACT OF THE DISCLOSURE

Disclosed are (1) novel haloalkoxysilanes of the formula $$CH(CF_2X_a)(CFX_bX_c)-O-Si-(CH_3)_nH_{3-n}$$

wherein $X_a$-$X_c$ are F or Cl, provided at least one but not more than two of $X_a$-$X_c$ are Cl, and wherein $n$ is an integer of from 1 to 3; (2) insecticidal fumigant compositions comprising these haloalkoxysilanes; and (3) a process for combatting noxious insects with vapors of these haloalkoxysilanes.

Background of the invention

This invention relates to certain novel haloalkoxysilanes, to use of certain haloalkoxysilanes as fumigants, and, more particularly, to a process for combatting noxious pest organisms.

Control of pest organisms which infest various hosts such as grain, fruits, vegetables, soils, textiles and the like, is extremely difficult, particularly in those cases where the pest organisms penetrate deeply into the interior of the host space. In such cases, the effectiveness of surface poisons is seriously impaired because of the difficulty in reaching the interior of the space. Many insect pets which infest areas and confined spaces which are difficult to reach or control by direct application of solid or liquid insecticides can be controlled by exposure to toxic gases or vapors of compounds known as funigants. This method is especially valuable in controlling pests in greenhouses, homes, warehouses, and the like, and is especially effective in ridding stored grain of destructive pests. Although various fumigants have been proposed, there is a need for new and highly effective fumigants.

It is an object of the present invention to provide novel haloalkoxysilanes.

It is another object of the present invention to provide novel compounds useful as insecticidal fumigants.

It is a further object of the present invention to provide insecticidal fumigant compositions.

It is a further object yet to provide a method of combatting pests, particularly insects, by subjecting the pests to the action of certain pesticides capable of thoroughly permeating the host space.

Description of the invention

It has now been discovered that haloalkoxysilanes of the formula

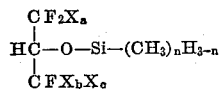

wherein $X_a$-$X_c$ are selected from the group consisting of F and Cl, with the proviso that $X_a$, $X_b$ and $X_c$ include at least one, but not more than two chlorine atoms, and wherein $n$ is an integer of from 1 to 3, are potent fumigants especially effective in destroying or controlling a wide variety of insect pests, especially such organisms as the various grain infesting insects and their larvae, as, for example, the confused flour beetles (*Tribolium confusum*), lesser meal worms (*Alphitobines diaperinum*), yellow meal worms (*Tenebrio molitar*) and the like.

The compounds of the present invention may be prepared by the direct reaction of an appropriate chloroperfluoroacetone with an appropriate methylsilane. The appropriate reactants are known compounds and may be prepared by known methods. Since the silane reactants are gaseous at normal temperature and pressure, the reaction is preferably carried out in closed vessels under superatmospheric pressure.

Reaction temperatures are not critical and may range between about 0° C. and about 200° C. Speed of reaction, as well as reaction pressure, are functions of temperature and increase with increasing reaction temperature. Choice of reaction temperature involves a comprise between desire to obtain short reaction times, and desire to avoid need for use of complex and expensive equipment required for high temperature and pressure operation. For economical operation, reaction temperatures between about 20° C. and about 150° C. preferred.

Reactant molar ratios are not critical. Reactants may be charged in stoichiometric amounts, or an excess of either reactant may be employed. For the sake of economy, one may employ the less costly reactant in excess of stoichiometrically required amount to thereby insure more complete utilization of the higher priced reactant. The desired product may be recovered from the reaction mixture by conventional methods, such as distillation, and if desired, may be further purified, as for example by fractional distillation.

In the process of the present invention, control of many noxious pests such as insects can be effected by treating the locus of the pests, i.e. the pests themselves, their environment, their food or their host, such as insect infested grains, flours, plants, soils, and the like, with an effective amount of the haloalkoxysilane fumigants of the invention. Although the process is particularly effective for control of grain infesting insects, such as the various meal worms and flour beetles, other pests such as mites, flies, roaches, etc., may be likewise controlled thereby. The pests combatted may be in adult, nymph, larval or egg form.

The pests are subjected to a toxic concentration of haloalkoxysilane fumigant according to well-established methods known in the art. The toxicant may be applied to the locus "as it" or in a variety of pesticidal compositions. According to a typical method, the toxicant is contacted with the locus of the pests in such manner that it is free to volatilize and permeate the atmosphere.

When fumigating grain, the grain is placed in an enclosure together with an effective amount of the toxicant. In such operations the toxicant may be introduced directly into the enclosure or at various levels within the stored grain. In the fumigation of bagged products such as flour or other milled grain products, these packaged materials are placed in an enclosure together with an effective amount of toxicant. Exposure of the infested locus may be likewise carried out in an atmosphere other than air, for example, carbon dioxide or nitrogen.

If desired, the toxicants can be incorporated in fumigant compositions comprising a toxicant together with a fumigant adjuvant therefor. Fumigant compositions can be supplied in the form of a spray employing solutions or emulsions of the toxicant in organic solvents and/or in water. Carbon tetrachloride, perchloroethylene, chloroform and deodorized oils such as kerosene, xylene and methylated naphthalenes are illustrative organic solvents employable. Alternative fumigant compositions are aerosol formulations of the toxicants, i.e. mixtures of the toxicants with a liquid of low boiling point that becomes a gas when released from a confined space. Suitable volatile diluents of this type include acetone, halogenated hydrocarbons such as hexafluoroethane, tetrafluoroethane, dichlorodifluoromethane, trifluoromethane and pentachlorofluoroethane. The concentration of the haloalkoxysilane toxicants employed in the compositions is not critical. An effective dosage of the toxicants generally may be supplied with compositions containing from about 25 to 90% by weight of toxicant.

The exposure of the pests to at least a minimum effective dosage of the toxicants of the invention is required for the practice of the present invention. In general, when the toxicants are employed to combat insects inhabiting an enclosed space, a dosage of about 1/32 to 2, preferably about 1/16 to 1 pound of the toxicant per 1000 cubic feet of the enclosed spaced is generally adequate to saturate the space and to insure effective control of the insects. The exposure time required depends upon the size of the enclosed space and the type of host, for example flour or grain in the area. In a space of 1000 cubic feet, the time normally required for most effective fumigation is from about 24 to 48 hours. In larger areas, such as grain elevators, desirable fumigation time may be about 24 to 72 hours.

The following examples and efficacy tests are given to further illustrate the practice of the present invention, but are not intended to be a limitation thereon.

EXAMPLE I

This example illustrates preparation of 1,3-dichloro-1,1,3,3-tetrafluoroisopropoxytrimethylsilane.

A glass pressure reactor of 100 ml. capacity was charged with 22 grams of sym.-dichlorotetrafluoroacetone. Reactor and contents were then cooled to −78° C., the reactor air space was evacuated, and 7.2 grams of trimethylsilane were introduced into the reactor via a vacuum manifold. The reactor was sealed and allowed to warm to room temperature (ca. 25° C.) and was kept at that temperature for a period of 18 hours. At the end of that period the reactor was opened and the liquid product was discharged therefrom. Distillation of the product at atmospheric pressure yielded 13.9 grams of unreacted dichlorotetrafluoroacetone and 5.9 grams of the sought-for product, (73% of theory based on sym.-dichlorotetrafluoroacetone consumed in the reaction), B.P. 144° C., $n_D^{25}=1.3776$.

Elemental analysis of the product so obtained compared with theoretical values as follows— Theory (percent): C, 26.33; H, 3.69; Cl, 25.96. Found (percent): C, 26.39; H, 3.61; Cl. 25.77.

The assigned structure was confirmed by infrared and N.M.R. spectroscopy.

EXAMPLE II

This example illustrates preparation of 1,3-dichloro-1,1,3,3-tetrafluoroisopropoxydimethylsilane.

A glass pressure reactor of 100 ml. capacity equipped with a pressure gauge was charged with 38.9 grams of sym.-dichlorotetrafluoroacetone. Reactor and contents were then cooled to −78° C., the reactor air space was evacuated, and 12 grams of dimethylsilane were introduced into the reactor via a vacuum manifold. The reactor was then heated to about 70° C., causing internal pressure rise to about 125 p.s.i.g. The reactor was kept at about 70° C. for a period of 96 hours, throughout which period internal pressure in the reactor remained at about 125 p.s.i.g. At the end of that period reactor and contents were allowed to cool to room temperature, the reactor was vented, and liquid reactor contents were subjected to distillation, yielding about 15 grams of unreacted sym.-dichlorotetrafluoroacetone, and 23 grams of sought-for product (72.3 percent of theory based on sym.-dichlorotetrafluoroacetone consumed), B.P. 128° C., $n_D^{25}=1.3724$.

Elemental analysis of the product so obtained compared with theoretical values as follows.—Theory (percent): C, 23.18; H, 3.11; Cl, 27.37. Found (percent): C, 23.10; H, 3.14; Cl, 27.19.

The assigned structure was confirmed by infrared and N.M.R. spectroscopy.

In like manner may be prepared 1,3-dichloro-1,1,3,3-tetrafluoroisopropoxy methylsilane,
1,1-dichloro-1,3,3,3-tetrafluoroisopropoxy methylsilane,
1,1-dichloro-1,3,3,3-tetrafluoroisopropoxy dimethylsilane,
1,1-dichloro-1,3,3,3-tetrafluoroisopropoxy trimethylsilane,
chloropentafluoroisopropoxy methylsilane,
chloropentafluoroisopropoxy dimethylsilane, and
chloropentafluoroisopropoxy trimethylsilane.

The effectiveness of illustrative examples of the new haloalkoxysilane fumigants for use according to my invention is illustrated by the tests described below.

Ten of each test insect or larvae were placed in 1.5 in. diameter salve tins having perforated lids, together with a small amount of appropriate food. The tins were then placed in separate one gallon jars together with cellucotton wads impregnated with 0.06 gram of fumigant compound (equivalent to an application rate of one pound of fumigant per 1000 cu. ft.), and the jars were sealed immediately. Exposure to the toxicant was maintained for 24 hours. The organisms were then removed from the jars and mortality counts were made after 5 days. In each case there were run concurrent check tests employing no fumigants, but under otherwise equal conditions. The table below shows the 5 day percent mortality after 24 hours' exposure of confused flour beetle adults (CFBA), lesser meal worm adults (LMWA), and yellow meal worm larvae (YMWL).

TABLE

| Compound | Percent mortality 5 days after 24 hours' exposure to 0.06 grams per one gallon jar | | |
| --- | --- | --- | --- |
| | CFBA | LMWA | YMWL |
| HC(CF₂Cl)₂OSi(CH₃)₃ | 100 | 100 | |
| HC(CF₂Cl)₂OSiH(CH₃)₂ | 40 | | 20 |
| Check | 0 | 0 | 0 |

While the above described the preferred embodiments of my invention, it is to be understood that departures can be made therefrom within the scope of the specification and claims.

I claim:
1. Compounds having the formula

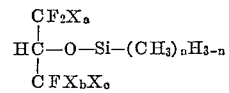

wherein $X_a$, $X_b$ and $X_c$ are selected from the group consisting of F and Cl, with the proviso that at least one, but not more than two of $X_a$, $X_b$ and $X_c$ are Cl, and wherein $n$ is an integer from 1 to 3.

2. Compounds according to claim 1 wherein $X_a$ and $X_b$ are Cl, and wherein $X_c$ is F.

3. A compound according to claim 2 having the formula

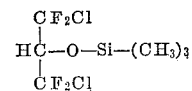

4. A compound according to claim 2 having the formula
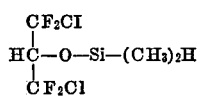
References Cited
UNITED STATES PATENTS
| | | | |
|---|---|---|---|
| 2,909,552 | 10/1959 | Chevalier | 260—448.8 |
| 3,038,000 | 6/1962 | Schmidt | 260—448.8 X |
| 3,331,813 | 7/1967 | Pittman et al. | 260—448.8 X |
| 3,422,131 | 1/1969 | Pittman et al. | 260—448.2 |
OTHER REFERENCES
Janzen et al., C.A., 63, 1965, pp. 18138–18139.
Cullen et al., C.A., 63, 1965, p. 14353 g.
HELEN M. McCARTHY, Primary Examiner
P. F. SHAVER, Assistant Examiner
U.S. Cl. X.R.
260—999; 424—184